Patented June 17, 1952

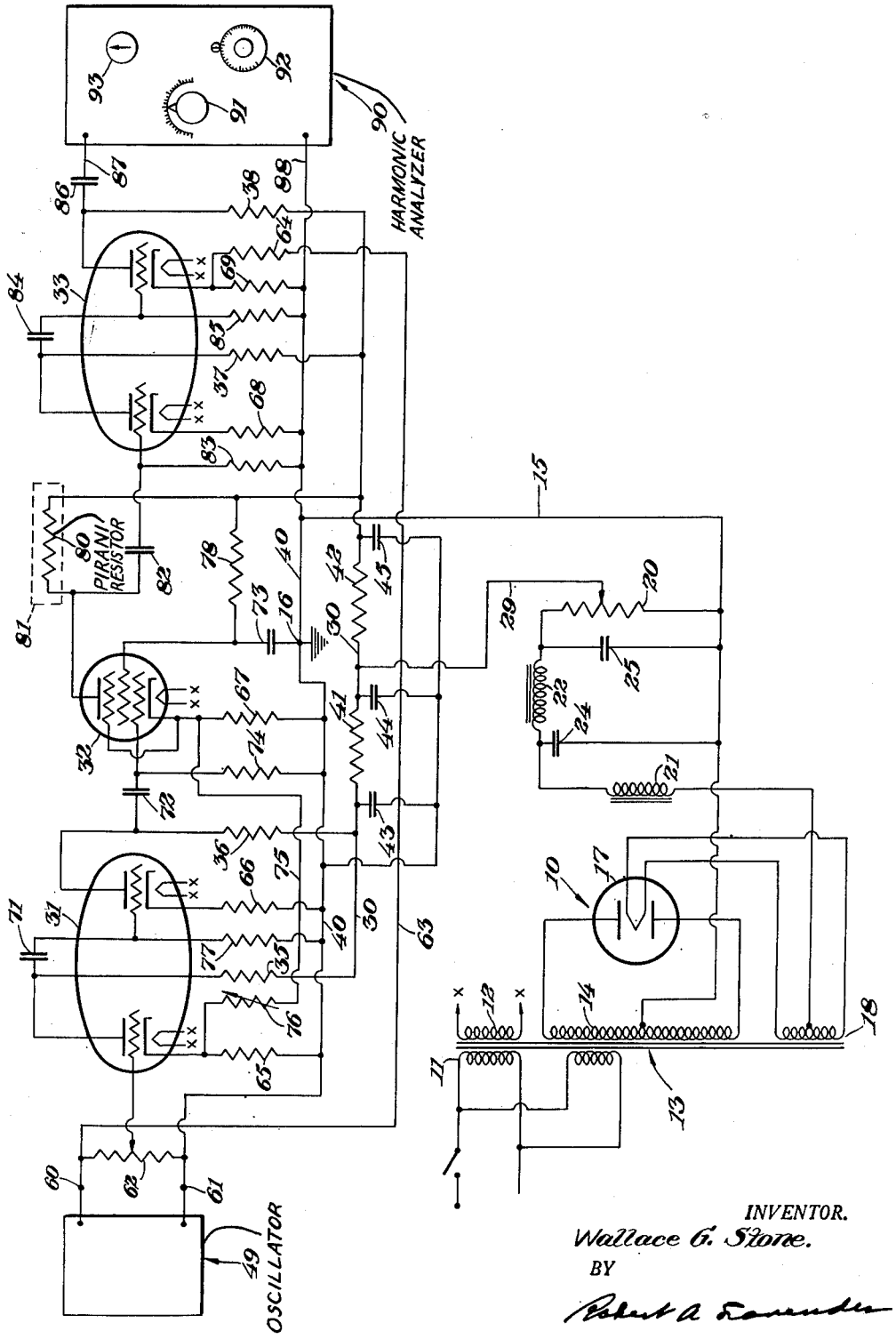

2,600,936

UNITED STATES PATENT OFFICE 2,600,936

METHOD AND APPARATUS FOR MEASURING LOW PRESSURES AND RELATED CONDITIONS

Wallace G. Stone, Oak Ridge, Tenn., assignor, by mesne assignments, to the United States of America as represented by the United States Atomic Energy Commission Application August 13, 1945, Serial No. 610,650

9 Claims. (Cl. 73—399)

This invention relates to accurate measurement, particularly to measurement of very low pressures of the order of 1 to 10 microns of mercury. Various methods have heretofore been known and used for measuring pressures of this order of magnitude but methods at present known and apparatus wherein these methods are used are imperfect, are susceptible of considerable inaccuracy and require the attention of skilled operating personnel. My invention as herein described has to do with what might be called a slightly more scientific approach to the problem of measuring pressures of the order of magnitude referred to above.

It has previously been common practice to measure pressure, using as the measuring element an electrical resistance, the resistivity of which would vary dependently, among other factors, upon the pressure, the dependency existing principally by virtue of temperature variations of the elements. Such an element is commonly known as a Pirani resistance or resistor and may be a piece of very fine platinum wire having a high ratio of surface area to volume and being susceptible to being heated to a high temperature.

Among the factors upon which the temperature of such a resistor will depend are the molecular activity of gas molecules in the vicinity of the resistor element, the electron emission from the element, the radiation therefrom and evaporation from the surface thereof. The latter factor can usually be considered negligible and not necessary to be considered.

A resistor of the type referred to has a time constant with reference to temperature change such that its temperature may change considerably in as little as 1/10,000 of a second. Each of the factors enumerated in the preceding paragraph has an influence on the temperature of the resistor and particularly with reference to my invention they have an influence on the rate of change of temperature of the resistance. My invention seeks to provide a way of giving an indication which is related to only one of the said factors individually. In the past it has been difficult or impossible to know to what proportionate extent a given indication was related to each of the said factors. The advantage of such a method or technique is apparent particularly in circumstances where it is desired to measure pressure for example, but where the temperature and/or conditions of electron emission in the vicinity of the resistor are not known.

My invention involves heating the resistance in the region wherein the pressure is to be measured with A. C. current, holding the A. C. current constant and then analyzing the harmonics in the voltage drop across the resistor. The resistor used is a non-linear resistor capable of changing temperature during an A. C. cycle. And such a resistor heated with A. C. current will give rise to a number of harmonics of the fundamental frequency of the current; that is, there will be a number of harmonics in the voltage drop across the resistor and these harmonics are attributable to, that is related to, particular individual factors described above. Due to the non-linearity of the resistor, that is, that its resistance varies with the current flowing through it, and that its temperature changes during the A. C. cycle, the rate of change of temperature being related to each of the said individual factors, there will be a harmonic of the fundamental frequency related to each factor. It can be mathematically demonstrated that there will be one harmonic attributable to or dependent primarily upon each of the said factors, including one dependent primarily upon the pressure in the vicinity of the resistor, that is, the density of gas molecules in that region. The mathematical demonstration of this fact is, however, not necessary to an understanding of this invention. The manner in which this principle is utilized will become apparent in the detailed description below.

In accordance with the foregoing, an object of my invention is to provide a method of measuring low pressure or other conditions attendant thereto comprising heating a non-linear resistor in the pressure region with A. C. current and analyzing the harmonics in the voltage drop across the resistor to determine the relative magnitude of individual harmonics.

Another object of the invention is to provide a pressure measuring device or system consisting of a non-linear resistor in the pressure region, a source of A. C. supply for heating the resistor, and means for analyzing the harmonics in the voltage drop across the resistor to determine the relative magnitudes of individual harmonics and further measuring the amplitude of the individual harmonic attributable primarily to pressure.

Another object of the invention is to provide a pressure measuring device or system as in the previous object wherein the fundamental frequency of the A. C. supply is suppressed or cancelled out to prevent its being impressed on the analyzing means, to thereby avoid impairing the sensitivity of the analyzing means.

Further objects and numerous of the advantages of my invention will become apparent from the following detailed description and annexed drawings wherein the single figure is a schematic diagram representing the circuits employed for producing the desired harmonics and analyzing them.

Referring to the drawing, a power supply for an amplifier circuit is indicated at 10. It comprises a conventional or standard power supply supplied with 110 volt 60 cycle power which is supplied to a transformer 11 having a secondary 12 which supplies the filaments of all the tubes used in the circuit, as schematically indicated by characters X on the leads to the filaments. The power supply is also connected to the transformer 13 of a full wave rectifier, this transformer having a secondary 14 having a center tap, the center tap being grounded by a wire 15 which connects to ground at point 16. The ends of the secondary 14 are connected to the plates of rectifier tube 17 and the filament of the tube 17 is connected to a secondary 18 of transformer 13. The mid-point or center tap of the secondary 18 connects to a voltage divider 20 through a conventional filtering system consisting of choke coils 21 and 22 and condensers 24 and 25, the latter condenser being across the voltage divider 20. The slider of voltage divider 20 is connected by wire 29 to a wire 30 and this wire connects to the plate circuits of all of the tubes used in the amplifier circuit. The tubes comprise a first twin triode tube designated 31 which may be a 6SN7 tube; a tube designated 32 which may be a 6SJ7 tube and a second twin triode tube designated 33 which also may be a 6SN7. The left and right triodes of tube 31 have plate load resistors 35 and 36 connected to wire 30 and the left and right triodes of the second 6SN7 tube, that is tube 33, have plate load resistors 37 and 38 connected to wire 30.

Decoupling means are provided between the wire 30 and wire 40, which connects to ground at point 16, consisting of resistances 41 and 42 and condensers 43, 44, and 45. The decoupling means functions in the conventional manner in high gain systems to prevent relaxation oscillations.

Numeral 49 designates a standard oscillator capable of producing a sine wave signal having a frequency of approximately fifty-five (55) cycles per second which is impressed between terminals 60 and 61 constituting the input to the measuring circuit. A voltage divider 62 is connected across the terminals 60 and 61 and the slider thereof connects to the grid of the left triode in tube 31. The entire oscillator input across terminals 60 and 61 is impressed on the output of the amplifier circuit by means of wire 63 which connects through resistance 64 to the cathode of the right triode in tube 33. The purpose of this will presently be explained. The cathodes in all of the tubes connect through resistances to the wire 40 which is grounded as previously described; the resistance associated with tube 31 being designated by numerals 65 and 66; the cathode of tube 32 is connected to wire 40 through resistance 67 and the cathodes associated with the two triodes of tube 33 are connected to wire 40 through resistances 68 and 69 respectively. Due to the voltage drops through these resistances all the cathodes operate at positive potential with respect to their respective grids as is conventional in three element tubes. The plate circuit of the left triode of tube 31 is connected through a blocking condenser 71 to the grid of the right triode in tube 31, and this grid is connected to wire 40 through grid return resistor 77. Since no D. C. current flows through resistor 77 the grid is negative relative to the cathode. Tube 31 constitutes an amplifier tube having two stages of amplification and the output thereof is connected through a blocking condenser 72 to the control grid of the 6SN7 tube, that is, tube 32. Tube 32 has a suppressor grid connected to the cathode as shown and a screen grid connected to ground at point 16 through the condenser 73. A resistance 78 is connected between the screen grid and wire 30. Due to the voltage drop therethrough the screen grid is reduced to the appropriate potential, (i. e.) approximately 150 volts positive with respect to the cathode. Tube 32 has a grid return resistor 74 connected from its control grid to ground, that is, the wire 40, whereby the grid is negative relative to the cathode. There is also a negative current feed back circuit comprising the wire 75 leading from the cathode of tube 32 through a variable resistance 76 for controlling the feedback, to the cathode of the left triode of tube 31. This negative feedback circuit functions in the conventional manner of negative current feedbacks tending to hold the A. C. current flowing through tube 32 at a constant value independent of load impedance so that the tube 32 operates as a constant A. C. current source to heat Pirani resistor 80 which is in the plate circuit of tube 32.

The resistor 80 is non-linear as described above and is disposed in the low pressure region wherein the pressure is to be measured, this space being designated by numeral 81. The plate circuit of tube 32 is connected through a condenser 82 to the grid of the left triode of the tube 33 and this grid is also connected to ground, that is, the wire 40, through a grid return resistor 83. Tube 33 is also an amplifier tube having two stages of amplification, the plate circuit of the left triode being connected through blocking condenser 84 to the grid of the right triode, this grid also being connected to ground, that is the wire 40, through a grid return resistor 85. The output of the tube 33, that is the plate circuit of the right triode, is connected through a condenser 86 to a terminal 87, the opposite terminal 88 being connected to the ground side of the circuit, that is, the wire 40.

The tube 32 functions as a constant current source, as described above, and due to the non-linear characteristics of the resistor 80 there will be in the voltage drop across it a number of harmonics which will be amplified by the tube 33 and impressed between the terminals 87 and 88. As explained in the foregoing, the different harmonics are attributable to individual characteristics of the non-linear resistor and as described it can be demonstrated mathematically that one harmonic will be attributable to or dependent principally on the pressure in the space 81, that is, dependent on the density of gas molecules therein. The output of the circuit which appears between the terminals 87 and 88 is impressed upon a harmonic analyzer 90 which may be of standard commercial type. The signal which is impressed on the harmonic analyzer does not include the fundamental frequency of the oscillator input 49, however, since this entire oscillator input is impressed on the output of the amplifier circuit through wire 63 connecting to the cathode of the right triode of tube 33. By adjusting the voltage divider 62 to adjust the magnitude of the input signal to the amplifier system, the output signal can be so regulated as to have the fundamental frequency substantially entirely cancelled out by the signal through wire 63. The signal impressed on the harmonic analyzer includes therefore only the harmonics in the voltage drop across resistor 80 amplified by tube 33. The reason for cancelling out the fundamental frequency is to avoid impressing too strong a signal upon the harmonic analyzer. The harmonic analyzer ordinarily is a device having an adjustment enabling it to be adjusted in accordance with the intensity of the signal to be analyzed, as indicated at 91. It is desired to not impress too strong a signal on the instrument and the fundamental frequency is therefore desirably cancelled out.

In my system it will ordinarily be the second or fourth of the harmonic frequencies which is the one directly related to pressure. By tuning the harmonic analyzer to various of the harmonics the relative magnitude of each can be observed and measured. The dial for tuning to desired frequencies is indicated at 92. Obviously therefore, the system can be used not only for measuring pressure but for determining any other condition or quality for which there is an individual harmonic frequency in the voltage drop across the resistor 80. To ascertain whether or not the particular frequency to which the harmonic analyzer is tuned is the one directly related to pressure, the pressure in the space 81 is varied when the analyzer is tuned to this particular harmonic and if its amplitude varies appreciably in accordance with the variations in pressure it is evidence that that is the harmonic which is attributable solely to pressure. The amplitude is read on meter 93. Other individual harmonics can be isolated, that is, related to the particular factor or characteristic to which they are attributable by tuning the analyzer to that particular harmonic and then varying the corresponding condition of the resistor 80 in order to observe its effect on the amplitude of that particular harmonic.

From the foregoing those skilled in the art will observe that I have provided an improved system and arrangement whereby pressure or other similar variables may be scientifically measured with a good degree of assurance that the indication given is an accurate measurement of the condition desired to be measured. No parts are susceptible to unusually rapid deterioration and constant adjustment of the system is not required.

The embodiment of my invention disclosed herein is representative of its preferred form. The disclosure is to be interpreted in an illustrative rather than a limiting sense, the scope of the invention being determined in accordance with the claims appended hereto.

I claim:

1. A method of measuring pressure and related similar conditions comprising heating a Pirani type resistor exposed to the said conditions with alternating current, for producing harmonics of the fundamental frequency of the voltage drop across the resistor related to the condition or conditions to be measured, analyzing said harmonics to determine that harmonic attributable to pressure, and measuring the amplitude of said harmonic as an index of pressure.

2. A method of measuring conditions such as pressure and the like comprising heating a Pirani type resistor exposed to the conditions with alternating current, for producing harmonics of the fundamental frequency of the voltage drop across the resistor directly related to the conditions to be measured, regulating the current flow through the resistor, to a substantially constant magnitude, isolating a predetermined one of said harmonics, and measuring the amplitude of said one harmonic as an index of pressure.

3. In apparatus of the character described, in combination, means comprising a Pirani type resistor disposed in a region wherein pressure is to be measured, means for heating the resistor by passing alternating current therethrough, for producing harmonics of the fundamental frequency of the voltage drop across the resistor, and a harmonic analyzer connected to receive said harmonics for measuring the amplitude of various of the harmonics, particularly the harmonic determinable as being directly related to pressure in the vicinity of the resistor.

4. In apparatus of the character described, in combination, means comprising a Pirani type resistor, means for heating the resistor by passing alternating current therethrough, for producing harmonics of the fundamental frequency of the voltage drop across the resistor, a harmonic analyzer connected to receive said harmonics for measuring the amplitude of various of the harmonics, particularly the harmonic determinable as being directly related to pressure in the vicinity of the resistor, and means for regulating the current flow through the resistor to limit its variation.

5. In apparatus of the character described, in combination, means comprising a Pirani type resistor, means for heating the resistor by passing alternating current therethrough, the characteristics of the resistor being such that its temperature changes during the alternating current cycle producing harmonics of the fundamental frequency of the voltage drop across the resistor, means for measuring the amplitude of various of the harmonics, particularly the harmonic determinable as being directly related to pressure in the vicinity of the resistor, means for regulating the current flow through the resistor to limit its variation, and means for suppressing the fundamental frequency of the voltage drop across the resistor so that it is not impressed on the means for measuring the amplitude of the various harmonics.

6. In apparatus of the character described, in combination, means comprising a source of oscillating current, an amplifier system and an electron discharge tube associated with the amplifier system, said tube having a Pirani type resistor in its plate circuit, the temperature of the resistor changing during the cycle of the alternating current passing through it whereby harmonics of the fundamental frequency of the voltage drop across the resistor are produced which are directly related to certain conditions associated with the resistor, means for measuring the amplitude of various of the harmonics, particularly the harmonic determinable as being directly related to pressure in the vicinity of the resistor, and means cooperating with the amplifier system whereby the current output of said tube is regulated to limit its variation.

7. In apparatus of the character described, in combination, means comprising a source of oscillating current, an amplifier system and an electron discharge tube associated with the amplifier system, said tube having a Pirani type resistor in its output circuit, the temperature of the resistor changing during the cycle of the alternating current passing through it whereby harmonics of the fundamental frequency of the voltage drop across the resistor are produced which are directly related to certain conditions associated with the resistor, means for measuring the amplitude of various of the harmonics, particularly the harmonic determinable as being directly related to pressure, and means cooperating with the amplifier circuit whereby the current output of said tube is regulated to limit its variation, said last means comprising a feedback circuit from the tube to one stage of the amplifier system.

8. In apparatus of the character described, in combination, means comprising a source of oscillating current, an amplifier system and an electron discharge tube associated with the amplifier system, said tube having a Pirani type resistor in its output circuit, the temperature of the resistor changing during the cycle of the alternating current passing through it whereby harmonics of the fundamental frequency of the voltage drop across the resistor are produced which are directly related to certain conditions associated with the resistor, means for measuring the amplitude of various of the harmonics, particularly the harmonic determinable as being directly related to pressure, means cooperating with the amplifier circuit whereby the current output of said tube is regulated to limit its variation, and means associated with the amplifier system and tube for suppressing the fundamental frequency of the voltage drop across the resistor so that it is not impressed on the means for measuring the amplitude of the harmonics.

9. A method of measuring pressure comprising heating a Pirani resistance with a substantially constant alternating current in the region where the pressure is to be measured, varying the pressure in said region, successively measuring the amplitude variation of different harmonics of the voltage drop across said resistance to determine the one harmonic having an amplitude modulated in accord with variation in said pressure, and thereafter isolating and measuring the amplitude of said one harmonic as an index of said pressure.

WALLACE G. STONE.

REFERENCES CITED

The following references are of record in the file of this patent:

UNITED STATES PATENTS

| Number | Name | Date |
|---|---|---|
| 1,809,062 | Osnos | June 9, 1931 |
| 1,873,984 | Sieber | Aug. 30, 1932 |
| 2,137,579 | Lundholm et al. | Nov. 22, 1938 |

FOREIGN PATENTS

| Number | Country | Date |
|---|---|---|
| 598,979 | Germany | June 7, 1931 |